March 15, 1938.     B. PRUZAN     2,111,004
SAFETY REMOVABLE FASTENER SLIDE
Filed Aug. 5, 1936
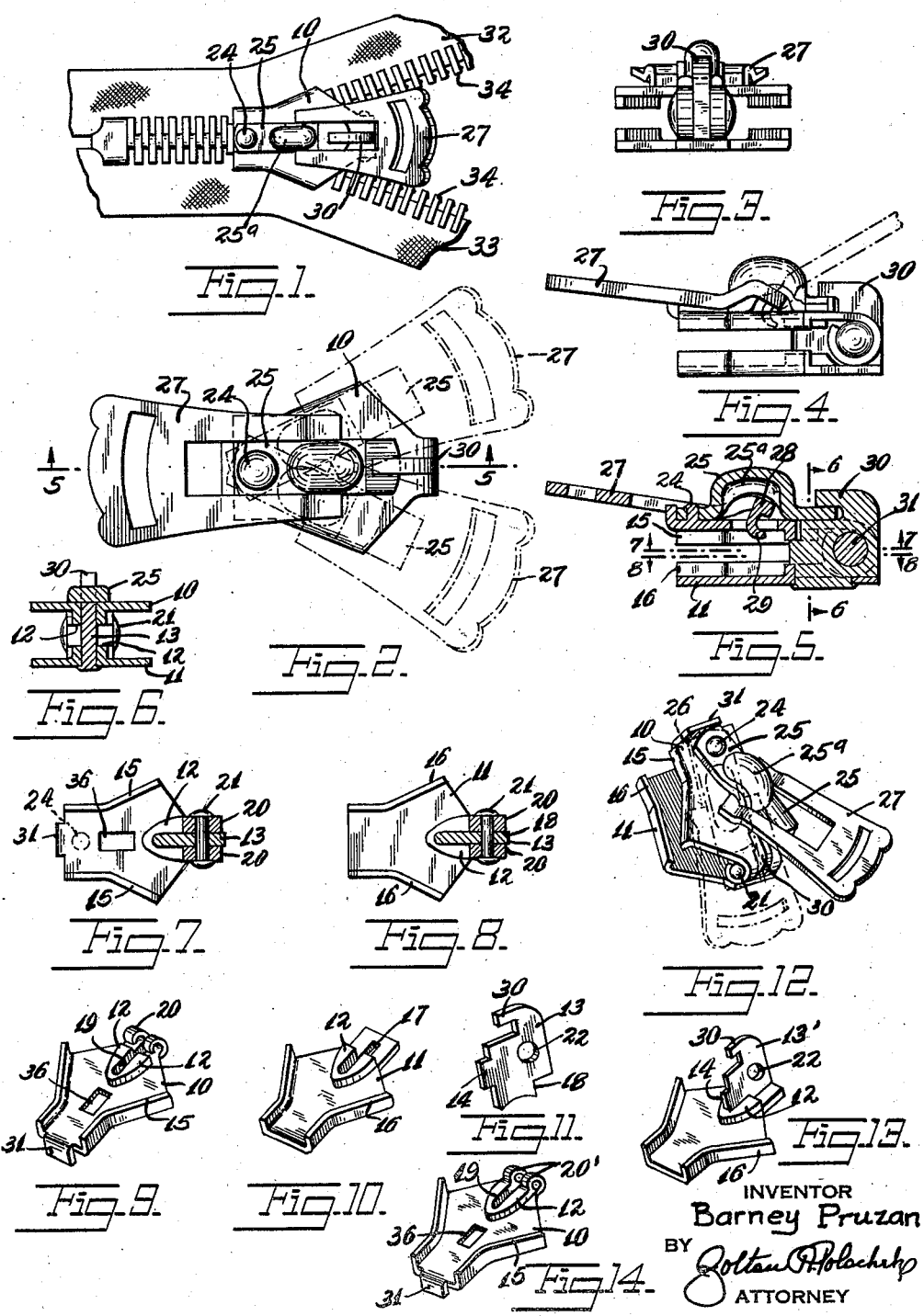
INVENTOR
Barney Pruzan
BY
ATTORNEY Patented Mar. 15, 1938

2,111,004

UNITED STATES PATENT OFFICE 2,111,004

SAFETY REMOVABLE FASTENER SLIDE

Barney Pruzan, New York, N. Y.

Application August 5, 1936, Serial No. 94,392

6 Claims. (Cl. 24—205)

This invention relates to new and useful improvements in a hook fastener slide.

The invention has for an object the construction of an article as mentioned which is characterized by a pair of trapezoidal guide members having opposed wedge shaped projections at their large ends, and a post element mounted on one of the members and pivotally associated with the other of the members and having a spacer portion disposed between said projections for limiting closing of said members. A feature of the construction resides primarily in the fact that the wedge shaped projections are integral with the trapezoidal members and may be manufactured at substantially no additional cost to the general cost of manufacturing the trapezoidal guide members.

Still further the invention contemplates making a pivot for the handle of the hook fastener, integral with one of the trapezoidal members. This also serves to reduce the cost of manufacture.

Another object of the invention resides in a novel arrangement of forming loop areas on one of the trapezoidal guide members by which it may be pivotally mounted.

Another object of the invention is to provide an arrangement whereby the post element may also be made integral with one of the trapezoidal guide members.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a plan view of a hook fastener slide constructed according to this invention.

Fig. 2 is an enlarged detailed view of the slide shown in Fig. 1 illustrated per se but illustrated with the handle pivoted towards the left.

Fig. 3 is an end elevational view of Fig. 2 seen from the right hand end.

u Fig. 4 is a side elevational view of Fig. 2.

Fig. 5 is a sectional view taken on the line 5—5 of Fig. 2.

Fig. 6 is a transverse sectional view taken on the line 6—6 of Fig. 5.

Fig. 7 is a sectional view taken on the line 7—7 of Fig. 5.

Fig. 8 is a sectional view taken on the line 8—8 of Fig. 5.

Fig. 9 is a perspective view of the trapezoidal guide member shown in Fig. 7.

Fig. 10 is a perspective view of the trapezoidal guide member shown in Fig. 8.

Fig. 11 is a perspective view of the post element.

Fig. 12 is a perspective view of the hook fastener slide in an open position.

Fig. 13 is a perspective view of a combination trapezoidal guide member and post element embodying a modification of the invention.

Fig. 14 is a perspective view of a trapezoidal guide member embodying a further modification of the invention.

The hook fastener slide, according to this invention, comprises a pair of trapezoidal guide members 10 and 11 each having a wedge shaped projection 12 at its larger end arranged on opposed faces when the trapezoidal members are in operative position. A post element 13 is mounted upon one of the members and is pivotally associated with the other of the members and has a spaced portion 14 disposed between the projections 12 for limiting the closing of the members.

The trapezoidal guide members 10 has an edge flange 15 opposed to an edge flange 16 on the guide member 11. A slot 17 is formed in the trapezoidal member 11 in which a rivet portion 18 of the post element 13 engages. This rivet portion is hammered out, as shown in Fig. 5, for fixedly mounting the post element on the member. The trapezoidal member 10 is formed with a slot 19 through which the post element 13 projects. Loop bearing portions 20 are curled from the material of the trapezoidal member 10 on opposite sides of the slot 19 and are adapted to accommodate a rivet 21 which is engaged through an aperture 22 formed in the post element 13 for pivotally connecting the trapezoidal member upon the post element.

A pivot 24 is integral with the member 10 and projects from the top thereof. A latch element 25 is swivelly mounted upon the pivot 24 and has a curved back portion 26 which limits its pivoting in one direction or the other, as indicated by the dot and dash lines 26 in Fig. 12. A handle 27 is pivotally mounted on the latch element 25. This pivotal mounting is accomplished by a transverse bar portion 28 from the handle 27 engaging beneath a tunneled out central portion of the latch element. A finger 29 projects from the bar 28 and in one position of the handle, the position shown in Fig. 5, is adapted to engage the hooks of the hook fastener for locking the slide in desired fixed positions. The latch element 25 is also formed with a hollow portion 25ᵃ into which the finger 29 engages when the handle 27 is pivoted to the position shown by the full lines in Fig. 1.

The post element 13 is formed with a top hook portion 30. In the central position of the latch element 25, its extremity engages beneath the hook 30 as shown in Fig. 2 for mounting the latch element in this position. The latch element 25 is limited in its pivoting to the right or the left by a lug portion 31 which projects from the member 10. This lug portion acts as a stop against which the edge 26 of the latch member engages.

In Fig. 1 the conventional hook fastener is shown. It comprises flexible adjacent strips 32 and 33 on the adjacent edges of which there are mounted engageable hooks 34. These hooks are engaged between the flanges 15 and 16 of the trapezoidal members which are adapted to relatively bend and interengage or dis-engage the hooks from each other, depending merely on the direction in which the slide is moved. The projections 12 act as a wedge for engaging or disengaging the hooks 34. It should be noted that the spacer portion 14 merely forms a stop against which the projections 12 engage (see Fig. 5) to correctly hold the guide members in their closed operative positions. The trapezoidal member 10 is formed with an opening 36 through which the finger 29 passes.

The operation of the device is as follows: When the handle 27 is swung to the position shown in Fig. 1 it is possible to force the handle to one side or the other to pivot the latch element 25 and disengage it from the hook 30. The trapezoidal members 10 and 11 may be pivoted apart a short distance as illustrated in Fig. 12. When thus pivoted, the trapezoidal guide members are open and it is possible to remove the hook fastener slide from the hooks 34.

In Fig. 13 a modified form of the invention has been disclosed which distinguishes from the previous form merely in the fact that the open element 13' is integral with the trapezoidal guide element 11. The parts may thus be cast as one unit. The necessity for the opening 17 and rivet portion 18 is thus eliminated. In other respects this form of the invention is identical to the previous form and similar parts may be recognized by the identical reference numerals.

In Fig. 14 another modified form has been disclosed which distinguishes from the prior form merely in the construction of the bearing loops 20'. These bearing loops are completely annular and formed by casting or similar operation. They distinguish from the loops 20 in that the latter are bent into form and thus have free ends.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a hook fastener slide, a pair of trapezoidal guide members having opposed wedge shaped projections at their larger ends, and a post element riveted on to one of said members and pivotally associated with the other of said members and having a spacer portion disposed between said projections for limiting closing of said members.

2. In a hook fastener slide, a pair of trapezoidal guide members having opposed wedge shaped projections at their larger ends, and a post element riveted on to one of said members and pivotally associated with the other of said members and having a spacer portion disposed between said projections for limiting closing of said members, said wedge shaped projections being formed with slots through one of which said post element is riveted, and through the other of which the post element passes.

3. In a hook fastener slide, a pair of trapezoidal guide members having opposed wedge shaped projections at their larger ends, and a post element riveted on to one of said members and pivotally associated with the other of said members and having a spacer portion disposed between said projections for limiting closing of said members, said wedge shaped projections being formed with slots through one of which said post element is riveted, and through the other of which the post element passes, the material to the sides of the slots of the pivotally mounted trapezoidal guide member being formed with curled portions forming bearings for receiving a pintle engaging through said post element for pivotally connecting these parts.

4. In a hook fastener slide, a pair of trapezoidal guide members having opposed wedge shaped projections at their larger ends, and a post element riveted on to one of said members and pivotally associated with the other of said members and having a spacer portion disposed between said projections for limiting closing of said members, one of said guide members being formed with a pivot portion integral therewith for receiving a latch element adapted to latch the guide members in operative positions.

5. In a hook fastener slide, a pair of trapezoidal guide members having opposed wedge shaped projections at their larger ends, and a post element riveted on to one of said members and pivotally associated with the other of said members and having a spacer portion disposed between said projections for limiting closing of said members, one of said guide members being formed with a pivot portion integral therewith for receiving a latch element adapted to latch the guide members in operative positions, with the wedge shaped projections engaging said spacer portion.

6. In a hook fastener slide, a pair of trapezoidal guide members having opposed wedge shaped projections at their larger ends, a post element riveted on to one of said members and pivotally associated with the other of said members and having a spacer portion disposed between said projections for limiting closing of said members, the pivotal guide member being formed with a slot through which said post element passes, and bearing loops on opposite sides of said slot for a pintle to accomplish the pivotal supporting of said loop.

BARNEY PRUZAN.